United States Patent
Lin

(10) Patent No.: US 9,436,480 B1
(45) Date of Patent: Sep. 6, 2016

(54) FIRMWARE RAM USAGE WITHOUT OVERLAYS

(71) Applicant: Western Digital Technologies, Inc., Irvine, CA (US)

(72) Inventor: Tino Lin, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 280 days.

(21) Appl. No.: 14/135,890

(22) Filed: Dec. 20, 2013

Related U.S. Application Data

(60) Provisional application No. 61/902,086, filed on Nov. 8, 2013.

(51) Int. Cl.
*G06F 9/44* (2006.01)
*G06F 9/50* (2006.01)

(52) U.S. Cl.
CPC ........... *G06F 9/4406* (2013.01); *G06F 9/5016* (2013.01)

(58) Field of Classification Search
CPC ..................................................... G06F 9/4406
See application file for complete search history.

(56) References Cited

U.S. PATENT DOCUMENTS

| | | | | |
|---|---|---|---|---|
| 7,577,814 B1 * | 8/2009 | Yakovlev | ............ | G06F 9/44557 713/2 |
| 2007/0239977 A1 * | 10/2007 | Wu | ........ | G06F 9/4403 713/2 |
| 2011/0010532 A1 * | 1/2011 | Li | ......... | G06F 9/4406 713/2 |
| 2012/0254599 A1 | 10/2012 | Kim | | |

OTHER PUBLICATIONS

Alessandro Rubini. 1997. Kernel Korner: Booting the Kernel. Linux Journal. vol. 1997 Issue 38es, Article 16 (Jun. 1997). Accessed from acm.org on Nov. 12, 2015.*

* cited by examiner

*Primary Examiner* — Kim Huynh
*Assistant Examiner* — Joshua Neveln
(74) *Attorney, Agent, or Firm* — Chang & Hale LLP

(57) ABSTRACT

Systems and methods are disclosed for managing program code in a computing device, such as an embedded system. In a data storage device, a non-volatile memory array stores program code comprising initialization code designed to be executed a single time during device booting, and main program code separate from the initialization code and designed to be executed after execution of the initialization code. A controller loads the initialization code to a first portion of a volatile memory array and executes the initialization code. The controller further loads the main program code, separately from the initialization code, to a second portion of the volatile memory array at least partially overlapping the first portion, and executes the main program code.

19 Claims, 5 Drawing Sheets

FIRMWARE RAM USAGE WITHOUT OVERLAYS

RELATED APPLICATION

This application claims the benefit of priority under 35 U.S.C. §119(e) of U.S. Provisional Application No. 61/902,086, filed on Nov. 8, 2013, and entitled "Firmware RAM Usage Without Overlays," the disclosure of which is hereby incorporated by reference in its entirety.

BACKGROUND

1. Field

This disclosure relates to computing devices. More particularly, the disclosure relates to systems and methods for managing program code in a computing device, such as an embedded system.

2. Description of Related Art

Certain computing systems and devices include firmware code that provides certain control programming for the system or device. Such code, or portions thereof, may be maintained in non-volatile memory and loaded to a volatile memory following power-on of the system or device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
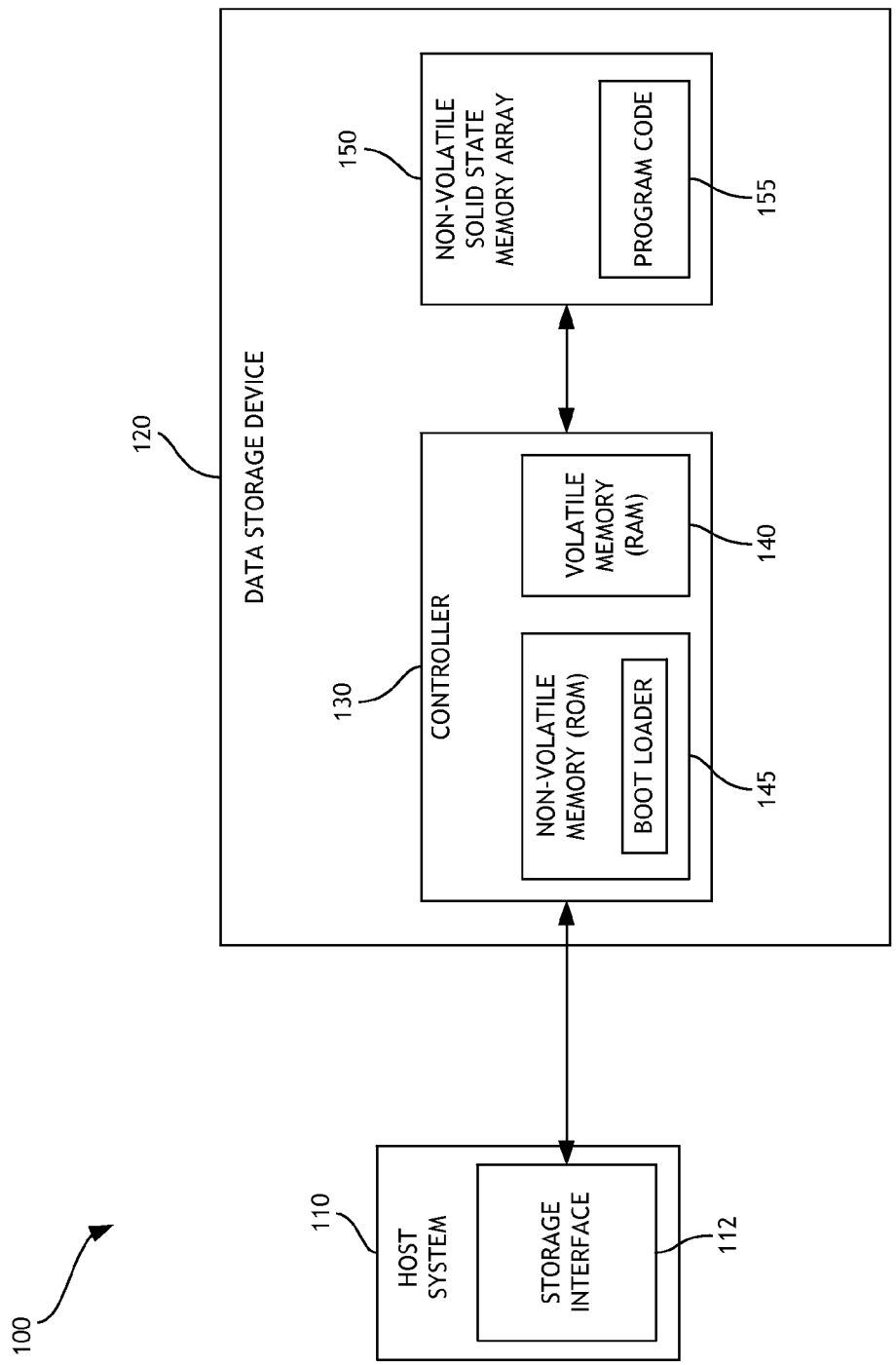
FIG. 1 is a block diagram of a data storage system according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

The present disclosure provides systems and methods for efficient use of memory (e.g., main memory, such as RAM) for firmware code. Firmware may provide the control program for a device, including initialization code as well as the main program code for the device. In certain embodiments, the control program code (i.e., program code) may be maintained in non-volatile memory and loaded to volatile memory during operation of the device. In embedded systems and other computing systems, the amount of available volatile memory (e.g., RAM) may be limited. For example, in an application-specific integrated circuit (ASIC), RAM may account for a substantial portion of the cost of producing the ASIC chip. To compensate for limited memory, computing systems may implement various programming methods, such as overlaying, wherein a block of stored instructions or data in volatile memory is replaced with another, as needed. Overlaying can allow for execution of programs that are larger than the available memory. For example, an embedded system may utilize overlays to compensate for the limitation of physical internal memory for a system-on-chip and/or lack of virtual memory facilities.

Although overlaying can help compensate for a lack of physical memory resources, constructing an overlay program can be complex and may require program customization. Furthermore, as embedded systems are often real-time systems, overlay loading time can negatively impact system performance in certain embodiments. Therefore, avoidance of overlaying may be desirable in certain systems.

Certain embodiments disclosed herein provide for at least partial compensation for limited memory resources (e.g., RAM) available in certain embedded systems and/or other computing systems without requiring overlay programming. Specifically, various method of loading and running firmware in RAM are disclosed, wherein initialization code is separated from the main firmware code. As described herein, "initialization code" may refer to portions of program code that is designed to only run once at device start-up, whereas the main firmware code, or "main program code," may comprise portions of program code including operating system code, hardware driver code, and/or other operational code.

A boot loader, such as a ROM boot loader module, may be permitted to load and run the initialization code first, after which another piece of code may load the main program code (e.g., firmware) from non-volatile memory (e.g., solid-state memory, such as flash memory) to volatile memory (e.g., RAM) and run the main program code. In certain embodiments, the final layout of the volatile memory includes the main code loader (i.e., a relatively small piece of code designed to read the main firmware from flash to RAM and jump to the main firmware in RAM) and the main program code, with the initialization code removed/overwritten. By separating the initialization code and the main code into two separate binary code segments, and providing a method for the two code segments to alternately run from volatile memory, overall volatile memory module size requirements may be reduced.

Certain embodiments disclosed herein provide a computing device including a non-volatile memory array storing initialization code and main program code, the main program code being separate from the initialization code. The device may further include a volatile memory array and a controller configured to load the initialization code to a first portion of the volatile memory array, execute the initialization code, load the main program code to a second portion of the volatile memory array at least partially overlapping the first portion, and execute the main program code.

The non-volatile memory array may include main code loader code that, when executed, directs the controller to load the main program code from the non-volatile memory to the volatile memory and execute the main program code. In certain embodiments, the controller is further configured to load the main code loader code to a third portion of the volatile memory array. The controller may further be configured to load the initialization code as part of a first load operation, load the main code loader code as part of a second load operation executed subsequently to the first load operation, and load the main program code as part of a third load operation executed subsequently to the second load operation. For example, a physical gap may separate the first and third portions in the volatile memory array.

In certain embodiments, the controller is further configured to load the initialization code and the main code loader code as part of a first load operation, and load the main program code as part of a second load operation executed subsequently to the first load operation. Furthermore, the first portion and third portion may be disposed adjacent to one another in the volatile memory array.

In certain embodiments, the computing device is a data storage device, such as a solid-state mass storage device. The controller may be further configured to execute the main program code without using program overlays. The non-volatile memory array may include flash memory. The main program code may include operating system code. In certain embodiments, the controller is further configured to execute the initialization code only once, during booting of the computing device. The initialization code and main program code may be separately-compiled pieces of code.

The initialization code may include, for example, a first number (X) of bytes of data, wherein the main program code includes a second number (Y) of bytes of data, and the volatile memory array consists of less than a third number (Z) of bytes of storage space, wherein Z=X+Y. For example, the volatile memory array may consist of approximately 48 kilobytes or less of storage space. The initialization code may include code that, when executed, directs the controller to perform power-on self-testing and initialize one or more peripheral devices. The device may further including a read-only memory (ROM) boot loader configured to direct the controller to load the initialization code to the non-volatile memory in response to power-up of the computing device. In certain embodiments, the non-volatile memory array, volatile memory array and controller are components of an embedded system.

In certain embodiments, volatile and/or non-volatile memory arrays described may comprise solid-state memory. As used in this application, "non-volatile solid-state memory," "non-volatile memory," "NVM," or variations thereof may refer to solid-state memory such as NAND flash. However, the systems and methods of this disclosure may also be useful in more conventional hard drives and hybrid drives including both solid-state and hard drive components. In some embodiments, the solid-state memory may be used in a computing device to extend storage capacity of volatile memory such as DRAM. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Data Storage System

FIG. 1 is a block diagram illustrating an embodiment of a combination of a host system 110 with a data storage device 120 incorporating functionality in accordance with embodiments disclosed herein. Although FIG. 1 illustrates a data storage device, embodiments disclosed herein may be applicable in other types of embedded systems, or other computing systems. As shown, the data storage device 120 (e.g., hybrid hard drive, solid-state drive, any storage device utilizing solid-state memory, etc.) includes a controller 130 configured to receive data commands and cause the controller 130 to execute such commands in the non-volatile solid-state memory array 150. Such commands may include data read/write commands, and the like. The controller 130 may be configured to receive data commands from a storage interface (e.g., a device driver) 112 residing on a host system 110. Data commands may specify a block address in the data storage device 120; data may be accessed/transferred based on such commands.

The data storage device 120 can store data received from the host system 110 such that the data storage device 120 acts as data storage for the host system 110. To facilitate this function, the controller 130 can implement a logical interface. The logical interface can present to the host system memory as a set of logical addresses (e.g., sequential/contiguous addresses) where data can be stored. Internally, the controller 130 can map logical addresses to various physical memory addresses in the non-volatile solid-state memory array 150 and/or other memory module(s). Mapping data indicating the mapping of logical addresses to physical memory addresses may be maintained in the data storage device. For example, mapping table data may be stored in non-volatile memory array(s) 150 in order to allow for recreation of mapping tables following a power cycle.

The controller 130 includes one or more memory modules, such as a non-volatile memory (e.g., ROM) and volatile memory (e.g., RAM, such as DRAM). Although the memory modules 140, 145 are depicted as part of the controller 130, in certain embodiments, one or more of the memory modules 140, 145 may be separate components or modules from the controller 130, or may be components of a separate device. In certain embodiments, the controller 130 may be configured to store software, including, for example, operating system(s), application code, and/or data, in the non-volatile solid state memory array 150. When the data storage device 120 is powered on, the controller 130 may be configured to execute a boot loader program stored in the non-volatile read-only memory (ROM) 145 at a predefined address to access the non-volatile solid state memory array 150, from which the initialization and/or main program code can be loaded into the volatile random-access memory (RAM) 140. The ROM 145 may be, for example, as large as 256 Kb in size, or larger.

The boot loader program causes the RAM 140 to load other data and programs 155 from the non-volatile solid state memory array 150 which are then executed from the RAM. The boot loader may further point the processor (not shown) to the code and start its execution. Embedded systems may generally utilize relatively small and inflexible, though relatively automatic, boot loader mechanisms to help ensure that the computer starts quickly and with a predetermined software configuration. In certain embodiments, the controller 130 may be configured to implement efficient program code loading/running functionality as described herein.

The program code may include both initialization code, as well as main function code. The initialization code may cause the controller to enumerate, configure, and/or initialize system buses, as well as system hardware. The controller 130 may then execute the main function code.

Efficient Firmware RAM Usage

Certain embodiments disclosed herein provide for the efficient allocation of main memory for program code (e.g., firmware). For example, program code may be developed and compiled for an embedded system. Once program code has been compiled, embodiments disclosed herein may provide for determining what portion(s) of the program code correspond to initialization routines that are designed to execute only once during start-up. Such portion(s) may be extracted and segregated (physically and/or logically) from the main program code, and may be compiled into separate binary code. In addition, a small program, referred to herein as the "main code loader," may be developed and designed to cause the processor to copy the main program code from the non-volatile memory array to RAM, and jump to the main program code for execution thereof.

The separated binary code corresponding to the initialization code may have added thereto appropriate code to copy the main code loader (e.g., a segment of code configured to cause the controller to load the main program code from the non-volatile memory array to the RAM) from flash. Alternatively, the main code loader may simply jump to the main program code, as described in greater detail below.

After extracting out the initialization code, the main code may be separately compiled. In one embodiment, for each of the three binary program segments (initialization code, main code loader, main code), the appropriate compiler setting may be set for where in volatile memory the respective binary code is executing from. In certain embodiments, the three binaries can be package into one binary, according to a layout as described below with respect to FIGS. 3 and/or 4. The packaged code may be loaded to non-volatile memory (e.g., flash). The program code may then be loaded and executed according to one or more processes as described below with respect to FIGS. 2-4. In certain embodiments, the ROM boot loader code is designed to load the correct amount of bytes to non-volatile memory and execute from the known location in accordance with the relevant process.

Figure 2:
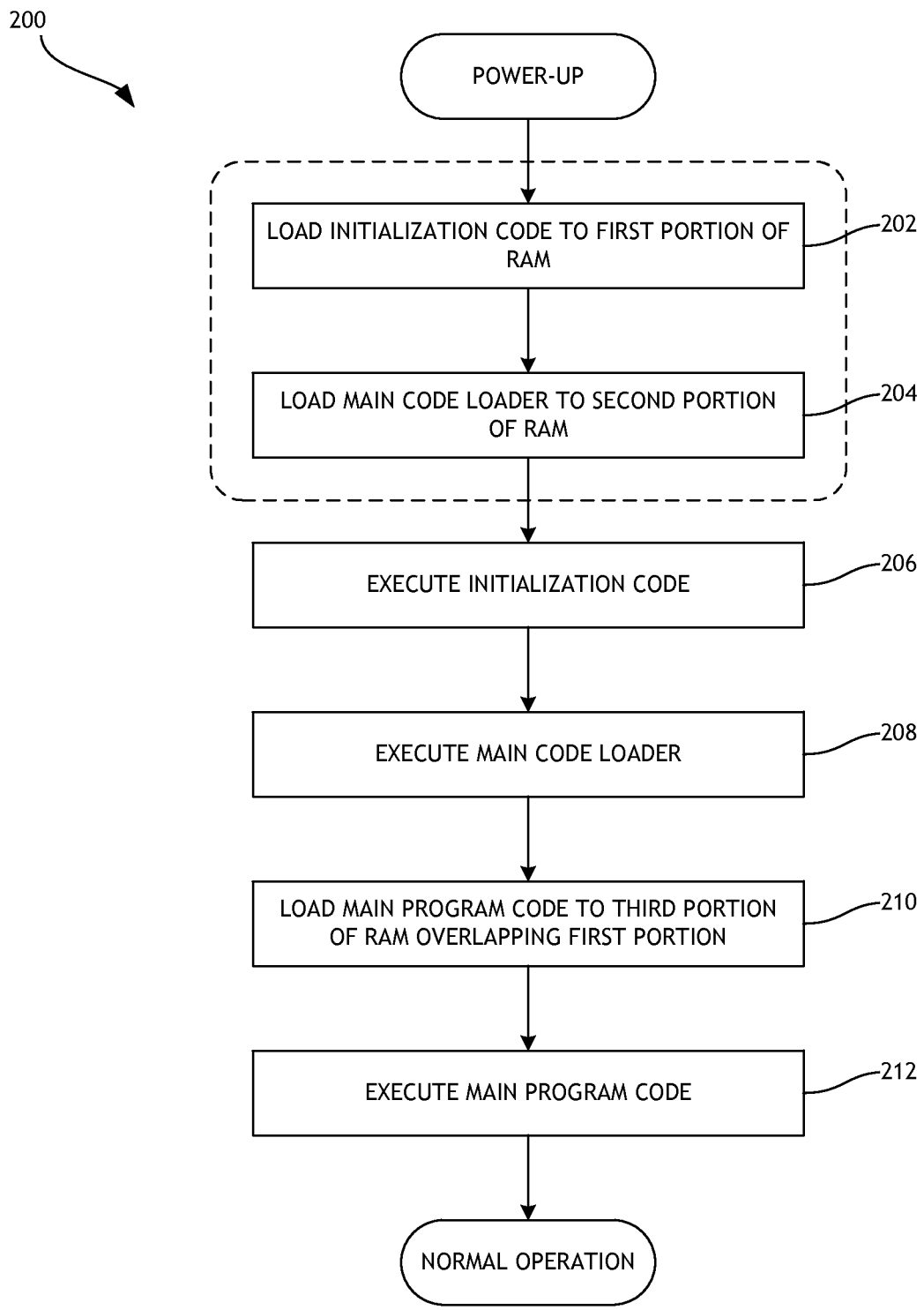
FIG. 2 is flow diagram of a process for managing program code in a computing device according to an embodiment.

FIG. 2 is a flow diagram illustrating a process 200 for loading and executing firmware in a computing system. In connection with power-up of a computing device (e.g., an embedded system), initialization code may be loaded from non-volatile memory, such as flash memory, to the device's main memory (shown at block 202). The initialization code may include binary code that is intended to only be run one time, during booting of the device. For example, the code may direct a processor of the device (e.g., a processor of a controller, such as the controller 130 described above) to perform one or more self-test operations and/or initialize one or more peripheral devices. In certain embodiments, the initialization code is extracted from, and stored separately from, the main program code in the non-volatile memory. At block 204, the process 200 may involve loading a segment of code from non-volatile memory designed to direct the controller to load the main program code from non-volatile memory to main memory. Such code is referred to herein as the "main code loader" or "main code loader code."

In certain embodiments, the initialization code and main code loader code are loaded to main memory as part of a single load operation. Furthermore, the initialization code and main code loader code may be loaded to adjacent portions, or segments, of the main memory, or may be loaded to portions of the memory having physical space between them, which may help to prevent undesirable interference or overlapping of code segments.

Once the initialization code and/or main code loader are loaded, the process 200 may include execution of the same, as shown at blocks 206 and 208, respectively. Execution of the main code loader may cause the main program code to be loaded from non-volatile memory to main memory. The main program code may include, for example, binary code designed to cause the controller to find, load, and/or start the relevant operating system(s) for the device. The process 200 may involve loading the main program code to a portion of the main memory that at least partially overlaps the previously-loaded initialization code. For example, the initialization code may have already been executed, such that, because the initialization code is designed to only be executed a single time, overwriting of some or all of the initialization code may be acceptable and may provide for more efficient use of volatile memory resources. Therefore, the amount of volatile memory utilized for firmware storage and execution may be reduced when compared to embodiments in which both initialization code and the main program code are stored concurrently in their entirety in main memory.

At block 212, the main program code may be executed, after which the device may enter a normal operation state. While the blocks of FIG. 2 are illustrated in a particular configuration, the individual steps of the process 200 may or may not be performed according to the depicted order. Furthermore, certain steps may be combined into single steps or operations, or may be divided into additional steps or operations. In certain embodiments, the process 200 is performed at least in part by a controller of an embedded system, such as the controller 130 described above.

Figure 3:
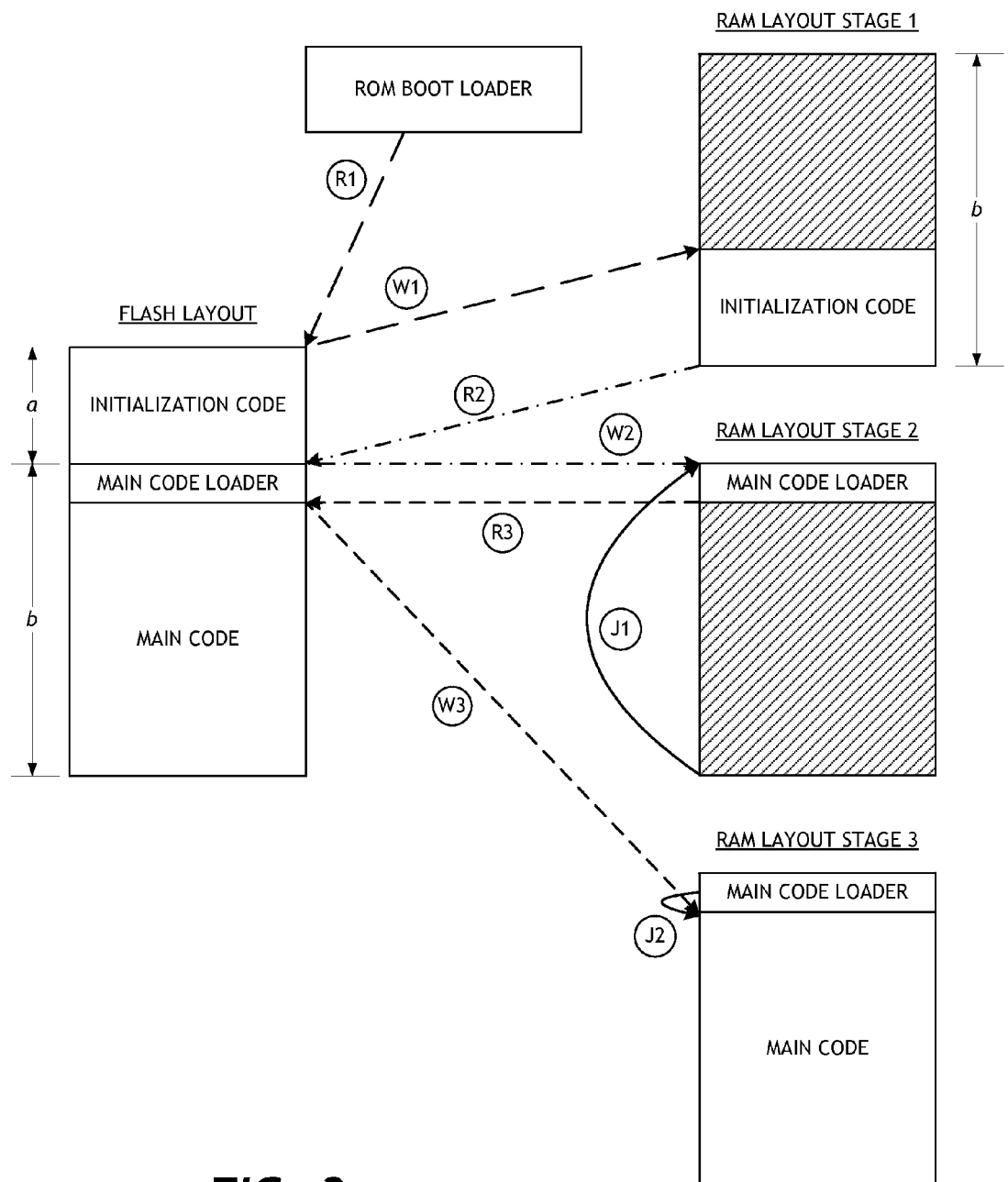
FIG. 3 is a block diagram illustrating a process for managing program code in a computing device according to an embodiment.

FIG. 3 illustrates a process of loading and executing firmware in a computing system. For example, the illustrated process may be performed by the controller 130 of a data storage system 100 as described above with respect to FIG. 1. Although flash and RAM memories are illustrated in FIG. 3 and described herein, the disclosed features may be applicable to other types of memories. In an embodiment, a boot loader program is read from ROM (R1) and executed upon system startup. The boot loader program may cause initialization code (segregated physically and/or logically from the remaining firmware) to be loaded from flash memory to RAM (W1) and executed. In certain embodiments, the initialization code is loaded to a bottom portion of the RAM, wherein the RAM has a size greater than or equal to b, as shown. In the illustrated embodiment, the size (a) of the initialization code is less than the size (b) of the RAM.

When execution of the initialization code is complete, the main code loader program is read from flash (R2) loaded from flash to the RAM (W2). The main code loader, the functionality of which is described above, may be loaded to a portion of the RAM that does not overlap the initialization code, which may help prevent overwriting of code that is still essential, thereby possibly preventing system crashes. For example, the main code loader may be loaded to a top portion of the RAM, as illustrated. The end of the initialization code may direct the controller to jump (J1) to the beginning of the main code loader code for execution thereof.

Once loaded, the main code loader may be executed, thereby causing the main code portion to be read from flash (R3) and loaded from flash to RAM (W3). The main code loader code direct the controller to jump (J2) to the main code portion for execution thereof. As illustrated, the process may include three total loads from flash to RAM (W1, W2, W3). The resulting RAM layout (RAM layout stage 3) may include only the main code loader and the main code. Therefore, the illustrated process may only require enough RAM space to store the main code and main code loader segments. In certain embodiments, the main code and/or main code loader have a size less than or equal to b, wherein b is less than the total size of the combined initialization code, main code loader code and main code. In certain embodiments, the RAM comprises approximately 48 Kb of storage space. Therefore, the process of FIG. 3 may provide a RAM savings approximately equal to the size (a) of the initialization code (e.g., approximately 10-20% of the overall program code) when compared to implementations in which the entire program code is stored contemporaneously in RAM.

Figure 4:
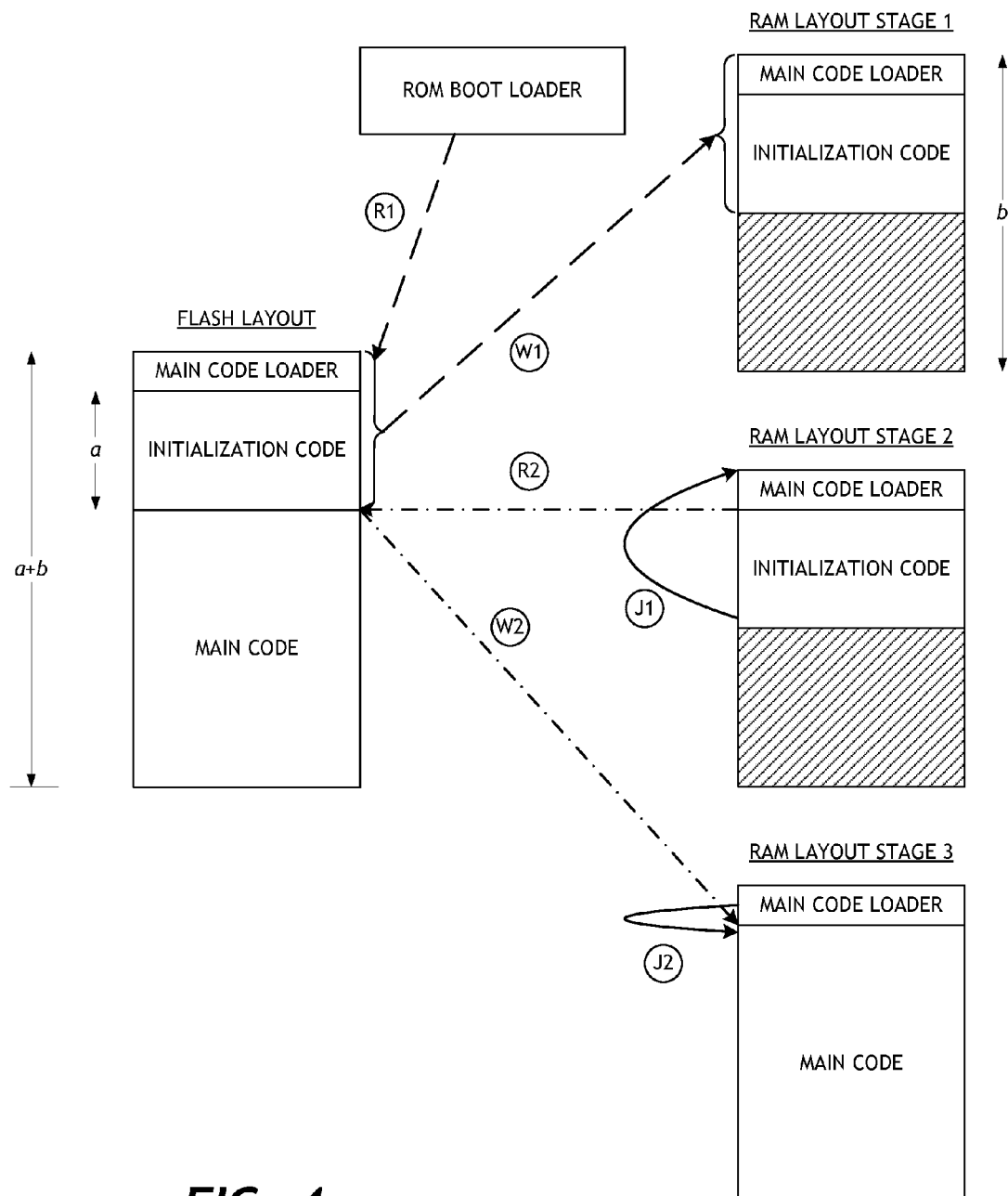
FIG. 4 is a block diagram illustrating a process for managing program code in a computing device according to an embodiment.

FIG. 4 illustrates another process of loading and executing firmware in a computing system. For example, the illustrated process may be performed by the controller 130 of a data storage system 100 as described above with respect to FIG. 1. Although flash and RAM memories are illustrated in FIG. 3 and described herein, the disclosed features may be applicable to other types of memories. In an embodiment, the ROM boot loader code is read (R1) and executed, which causes a portion of code including the initialization code, as well as the main code loader, to be loaded from flash to RAM (W1), and causes the initialization code to be executed.

When execution of the initialization code completes, the initialization code may cause the processor to jump (J1) to the main code loader, which was previously loaded in RAM. Execution of the main code loader may cause (R2) the main code to be loaded from flash to RAM (W2). The main code loader may further cause the processor to jump to the main code (J2) for execution thereof. In certain embodiments, the main code overwrites the previously-executed initialization code.

The embodiment of FIG. 4 may provide a similar savings in RAM space to that of FIG. 3. However, the process of FIG. 4 may advantageously only require two loads from flash to RAM (W1, W2), which may improve system performance.

Systems and methods disclosed herein may provide various advantages over traditional overlay programming, or other methods. For example, as demonstrated in FIGS. 3 and 4, methods disclosed herein may provide reduced RAM usage for the final firmware code. In certain embodiments, only approximately 48 KB is required to store the final firmware, without requiring overlaying when executing the main code. Because overlaying may not be required, the final firmware may be able to execute at full speed of the RAM without having to do overlays. As overlaying can require the firmware to read code from flash to RAM, significant performance savings may be achieved by avoiding overlays.

Reducing the code size may prevent having to implement hardware caching or overlays when there is a RAM size limit for the ASIC. Furthermore, methods described herein may provide for relatively easier design and implementation when compared to overlay methods. This is due to not having to design the compiler to accommodate the overlay functionality. Certain embodiments disclosed herein provide for improved code portability, wherein code may be used across systems, and/or with various compilers. For example, embodiments disclosed herein may be implemented in different systems by simply modifying RAM addresses associated with various code segments.

Figure 5:
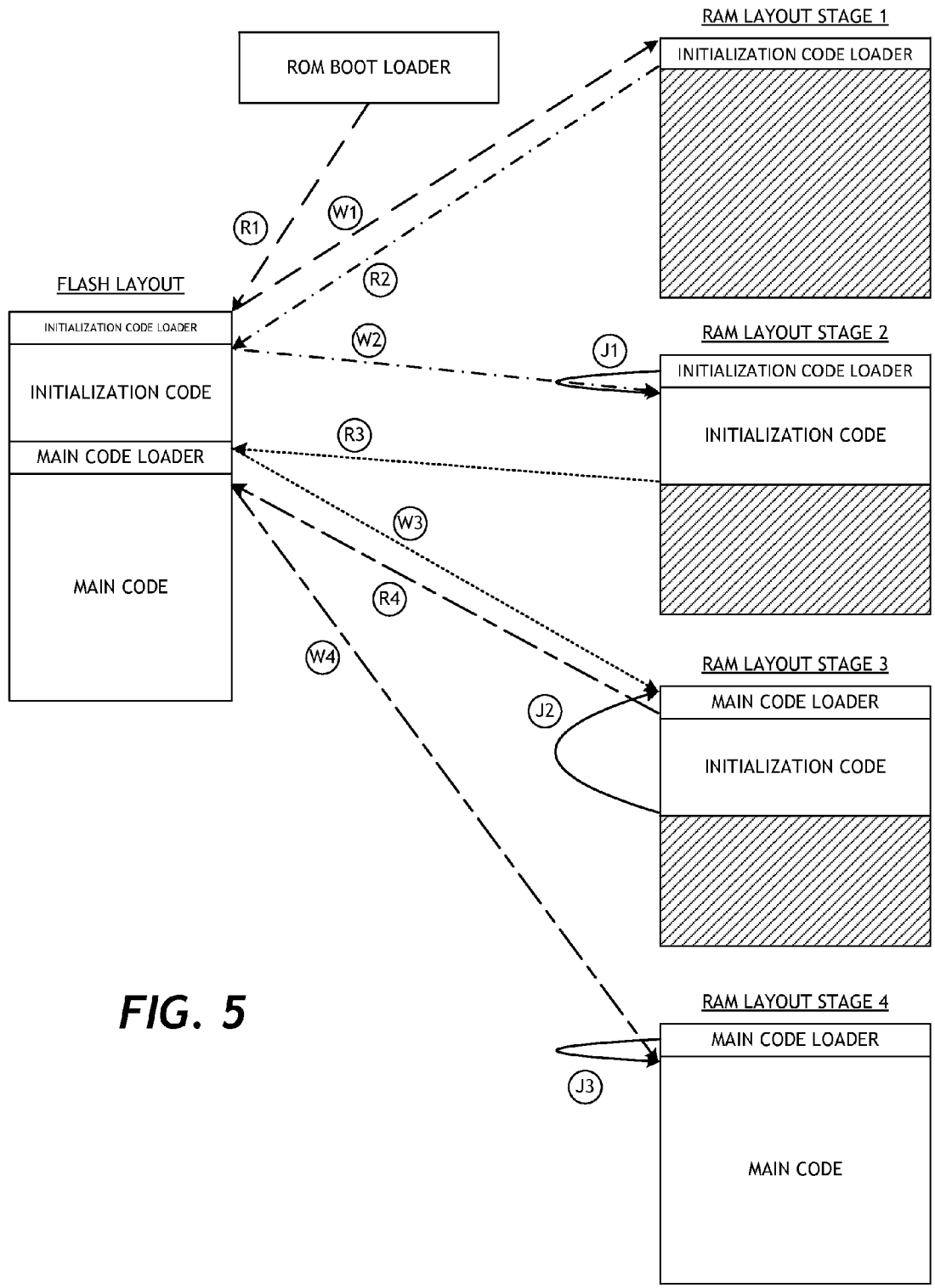
FIG. 5 is a block diagram illustrating a process for managing program code in a computing device according to an embodiment.

FIG. 5 illustrates another process of loading and executing firmware in a computing system. For example, the illustrated process may be performed by the controller 130 of a data storage system 100 as described above with respect to FIG. 1. Although flash and RAM memories are illustrated in FIG. 3 and described herein, the disclosed features may be applicable to other types of memories. In an embodiment, the ROM boot loader code is read (R1) and executed, which causes a portion of code referred to herein as the "initialization code loader" code, to be loaded from flash to RAM (W1), and causes the initialization code loader to be executed. In certain embodiments, the initialization code loader code comprises code that, when executed, directs the controller to load the initialization code from the non-volatile memory to the volatile memory (R2/W2) and execute the initialization code. Use of initialization code loader code may advantageously provide a fixed code size for readout by the boot loader from the flash. Therefore, the code loaded by the boot loader may comprise a fixed size, whereas the initialization code size may be modifiable during development.

When execution of the initialization code loader code completes, the initialization code loader code may cause the processor to jump (J1) to the initialization code. Execution of the initialization code may cause the main code loader code to be loaded from flash to RAM (R3/W3). The initialization code may further cause the processor to jump to the main code loader code (J2) for execution thereof. In certain embodiments, the main code loader code overwrites the previously-executed initialization code loader code.

When execution of the initialization code completes, the initialization code may cause the processor to jump (J2) to the main code loader, which was previously loaded in RAM. Execution of the main code loader may cause the main code to be loaded from flash to RAM (R4/W4). The main code loader may further cause the processor to jump to the main code (J3) for execution thereof. In certain embodiments, the main code overwrites the previously-executed initialization code.

Additional Embodiments

Those skilled in the art will appreciate that in some embodiments, other types of data storage systems and/or programming schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

Accordingly, the scope of the present disclosure is intended to be defined only by reference to the appended claims.

What is claimed is:

1. A computing device comprising:
 a volatile random access memory (RAM);
 a non-volatile boot read-only memory (ROM) comprising ROM boot loader code;
 a non-volatile flash memory storing program code comprising:
  initialization code designed to be executed a single time during device booting;
  main program code separate from the initialization code and designed to be executed after execution of the initialization code; and
  main code loader code designed to cause the main program code to be loaded from the flash memory to the RAM; and
 a controller configured to:
  read the ROM boot loader code from the boot ROM and execute the ROM boot loader code;
  in response to said executing the ROM boot loader code, load the initialization code and the main code loader code to first and second adjacent portions of the RAM, respectively, as part of a single load operation;
  execute the initialization code;
  execute the main code loader code;
  in response to said executing the main code loader code, load the main program code, separately from the initialization code, to a third portion of the RAM at least partially overlapping the first portion but not overlapping the second portion, thereby at least partially overwriting the initialization code; and
  execute the main program code.

2. The computing device of claim 1, wherein the flash memory comprises initialization code loader code that, when executed, directs the controller to load the initialization code to the first portion of the RAM and execute the initialization code.

3. The computing device of claim 1, wherein a physical gap separates the second and third portions in the RAM.

4. The computing device of claim 1, wherein the controller is further configured to load the main program code as part of a second load operation executed subsequently to the single load operation.

5. The computing device of claim 1, wherein the second portion and third portion are disposed adjacent to one another in the RAM.

6. The computing device of claim 1, wherein the computing device is a data storage device.

7. The computing device of claim 1, wherein the controller is further configured to execute the main program code without using program overlays.

8. The computing device of claim 1, wherein the main program code comprises at least one of operating system code and hardware device driver code.

9. The computing device of claim 1, wherein the controller is further configured to execute the initialization code only once, during booting of the computing device.

10. The computing device of claim 1, wherein execution of the initialization code by the controller does not involve saving global data for use by the main program code.

11. The computing device of claim 1, wherein the initialization code and main program code are separately-compiled pieces of code.

12. The computing device of claim 1, wherein the initialization code comprises X bytes of data, the main program code comprises Y bytes of data, and the RAM consists of less than Z bytes of storage space, wherein Z=X+Y.

13. The computing device of claim 1, wherein the initialization code comprises code that, when executed, directs the controller to perform power-on self-testing and initialize one or more peripheral devices.

14. The computing device of claim 1, wherein the controller is further configured to read and execute the ROM boot loader code in response to power-up of the computing device.

15. The computing device of claim 1, wherein the flash memory, RAM and controller are components of an embedded system.

16. A method of booting a computing device, the method comprising:
 reading ROM boot loader code from a boot ROM;
 executing the ROM boot loader code;
 in response to said executing the ROM boot loader code, loading initialization code designed to be executed a single time during device booting and main code loader code designed to cause main program code to be loaded from a non-volatile flash memory to a volatile random access memory (RAM) to first and second adjacent portions of the RAM from the flash memory;
 executing the initialization code;
 executing the main code loader code;
 in response to said executing the main code loader code, separately from the initialization code, loading main program code designed to be executed after execution of the initialization code from the flash memory to a third portion of the RAM at least partially overlapping the first portion but not overlapping the second portion, thereby at least partially overwriting the initialization code; and
 executing the main program code.

17. The method of claim 16, further comprising loading initialization code loader code and executing the initialization code loader code, wherein said loading and executing the initialization code is performed in response to execution of the initialization code loader code.

18. The method of claim 16, wherein said loading the initialization code and loading the main code loader code are performed as part of a first load operation, and said loading the main program code is performed as part of a second load operation executed subsequently to the first load operation.

19. The method of claim 16, wherein said executing the main program code is performed without using program overlays.

* * * * *